US006059912A

United States Patent [19]

Kellogg et al.

[11] Patent Number: 6,059,912

[45] Date of Patent: May 9, 2000

[54] METHOD OF MAKING AND USING A SEMI RIGID CONTAINER

[76] Inventors: Michael S. Kellogg, N78 W36648 Saddlebrook La., Oconomowoc, Wis. 53066; Dean B. Krotts, 3324 N. 94th St., Milwaukee, Wis. 53222

[21] Appl. No.: 09/173,079

[22] Filed: Oct. 14, 1998

Related U.S. Application Data

[62] Division of application No. 09/114,370, Jul. 14, 1998, Pat. No. 5,967,357.

[51] Int. Cl.$^{7}$ .......... B29C 53/04

[52] U.S. Cl. .......... 156/217; 493/189; 493/254; 493/264

[58] Field of Search .......... 156/217, 292, 156/308.4; 493/89, 133, 162, 218, 254, 936, 189, 264

[56] References Cited

U.S. PATENT DOCUMENTS

| | | | |
|---|---|---|---|
| 216,227 | 6/1879 | Sedgwick . | |
| 338,892 | 3/1886 | Walker . | |
| 344,340 | 6/1886 | Barrow . | |
| 356,301 | 1/1887 | Belknap . | |
| 775,268 | 11/1904 | Flowers | 493/254 |
| 1,135,892 | 4/1915 | Grosenbeck . | |
| 1,155,475 | 10/1915 | Fay . | |
| 1,180,574 | 4/1916 | Deespot . | |
| 1,538,260 | 5/1925 | Street et al. . | |
| 1,581,888 | 4/1926 | Thomas . | |
| 1,691,904 | 11/1928 | Gamble . | |
| 1,979,978 | 11/1934 | Martin . | |
| 1,994,235 | 3/1935 | Solomon . | |
| 1,999,424 | 4/1935 | Seitz . | |
| 2,182,932 | 12/1939 | Sandford . | |
| 2,269,574 | 1/1942 | Benenfeld . | |
| 2,298,786 | 10/1942 | Dubofsky et al. . | |
| 2,575,893 | 11/1951 | Seaman . | |
| 2,625,973 | 1/1953 | Weldon et al. . | |
| 2,710,084 | 6/1955 | Braverman . | |
| 2,746,582 | 5/1956 | Cart . | |
| 2,778,560 | 1/1957 | Pfeiffer . | |
| 3,233,644 | 2/1966 | Bono . | |
| 3,373,925 | 3/1968 | Gatward . | |
| 3,675,667 | 7/1972 | Miller . | |
| 3,696,850 | 10/1972 | Rosenblum . | |
| 3,960,161 | 6/1976 | Norman . | |
| 3,990,463 | 11/1976 | Norman . | |
| 4,036,361 | 7/1977 | Jacobson | 206/386 |
| 4,055,239 | 10/1977 | Weiner . | |
| 4,505,190 | 3/1985 | Fink | 138/97 |
| 4,697,357 | 10/1987 | Van Vliet . | |
| 4,784,248 | 11/1988 | Workman . | |
| 4,813,520 | 3/1989 | Lin . | |
| 4,815,784 | 3/1989 | Zheng | 296/97.7 |
| 4,825,892 | 5/1989 | Norman . | |
| 4,858,634 | 8/1989 | McLeese . | |
| 4,862,602 | 9/1989 | Krill . | |

(List continued on next page.)

OTHER PUBLICATIONS

Playhut Inc. brochure, 1995.

*Primary Examiner*—Daniel Stemmer
*Attorney, Agent, or Firm*—Ryan Kromholz & Manion S.C.

[57] ABSTRACT

A semi rigid container comprising a plurality of generally rectangular side walls and a bottom wall attached to the bottom of each side wall. A plurality of flexible supporting frames are attached to each side wall to expand the container's open top and to brace the side walls into a free standing container for handy storage, transportation or disposal of refuse or other articles. A drawstring is provided along the top of the container for easy closure. The semi rigid container is made by attaching the flexible supporting frames to one or more sheets of flexible material, layering the sheet or sheets, and sealing the open margins of the layered sheet or sheets corresponding to the container's sides and bottom. The semi rigid container can be easily collapsed into a stack of side walls, then coiled into three adjacent loops and inserted into a storing receptacle.

14 Claims, 10 Drawing Sheets

U.S. PATENT DOCUMENTS

| | | | |
|---|---|---|---|
| 4,895,230 | 1/1990 | King . | |
| 4,951,333 | 8/1990 | Kaiser et al. . | |
| 4,995,487 | 2/1991 | Plath . | |
| 5,009,189 | 4/1991 | Neff . | |
| 5,038,812 | 8/1991 | Norman | 135/104 |
| 5,072,828 | 12/1991 | Irvine . | |
| 5,090,588 | 2/1992 | Van Romer et al. . | |
| 5,116,138 | 5/1992 | Macsenti et al. . | |
| 5,213,147 | 5/1993 | Zheng . | |
| 5,358,440 | 10/1994 | Zheng | 446/48 |
| 5,664,886 | 9/1997 | Hutchinson | 383/4 |
| 5,800,067 | 9/1998 | Easter . | |
| 5,971,188 | 10/1999 | Kellogg | 383/12 |

METHOD OF MAKING AND USING A SEMI RIGID CONTAINER

This is a divisional application of U.S. patent Parent application Ser. No. 09/114,370 filed Jul. 14, 1998 now U.S. Pat. No. 5,967,357.

BACKGROUND OF THE INVENTION

The present invention relates generally to household products and specifically to a semi rigid container and a method of making and using such container for convenient storage, transportation, and disposal.

A typical household often encounters a need for temporary storage, transportation and disposal of refuse. Regardless of how or where refuse is generated, either at home, in a commercial environment, or in recreational surroundings, a receptacle for gathering, storing, transporting, and disposing of refuse is necessary. Even though the present invention is an ideal container for storing, transporting, and disposing of refuse, the semi rigid container can also be used for other purposes such as storing or transporting clothing, bedding, popcorn, or any other article. Accordingly, the present invention's use should not be limited to storage, transportation or disposal of refuse.

Numerous devices are known in the art to provide effective storage, transportation and disposal of refuse. Typically, a trash bag, a trash receptacle, or a combination of a bag and receptacle is used. See for example U.S. Pat. No. 5,072,828 to Irvine which discloses a knock-down roadside trash protector.

However, trash receptacles are voluminous, taking up considerable space such that keeping numerous trash receptacles is impractical for occasional, temporary use during parties or other gatherings. Trash receptacles are also difficult to transport from one area to another, especially for picnics, camping, or other recreational activities. Furthermore, trash receptacles become dirty and smelly if not cleaned regularly or lined with some type of trash bag.

Although a trash bag provides an alternative to cleaning a trash receptacle, a trash bag is not freestanding and depends on a trash receptacle or other bulky support device to brace the bag and expand its opening so that one can easily dispose of unwanted refuse.

Another product, the collapsible container, is freestanding and collapsible, but is intended for repeated and continual use. Although the collapsible container provides a receptacle that will handily store and transport articles, including refuse, the collapsible container contains many pieces integrally connected, thus making it difficult and expensive to manufacture. So much so that disposal of the product after a single or short use is unthinkable.

The semi rigid container of the present invention solves the above-mentioned shortcomings and provides a convenient, freestanding, collapsible, container that is handy for storing, transporting, and disposing of refuse or other articles. The semi rigid container further accomplishes its purpose in an easy to build and cheap to manufacture manner such that it can be disposed of after one or more uses.

SUMMARY OF THE INVENTION

According to the present invention, the foregoing and other objects and advantages are attained by providing an open-topped container made from at least one sheet of flexible material supported by a number of flexible supporting frames secured to the sides of the container.

In accordance with another aspect of the invention, a drawstring is contained within a hem running along the top edge of the container to allow easy closure of the container. So that one can easily grab and pull on the drawstring when closing the bag, the drawstring is exposed through at least one opening in the hem.

A further advantage of the invention is to collapse the container from its expanded state into a more compact form for easy storage or transportation. The preferred steps of collapsing the container include grasping opposite corners of the floor panel and biasing one corner toward the other until all side walls are adjacent and overlay each other. At this stage the container is partially collapsed and each side wall is still in an expanded state. Further collapsing of the container may be achieved by inserting the bottom wall between any two of the adjacent overlaying side walls; rotating two opposite corners of the overlaying side walls in opposite directions while biasing the two corners toward each other, thereby forming three overlaying circular loops folded adjacently.

A method for manufacturing the container includes providing a sheet of flexible material, positioning a plurality of supporting frames upon the sheet, securing the supporting frames to the sheet, folding the sheet intermediately so that the supporting frames approximately overlay one another, and securing all open margins of the folded sheet except those margins corresponding to the container's open top.

Another method of manufacturing the semi rigid container includes providing two sheets of flexible material, positioning a plurality of supporting frames upon the sheets, securing the supporting frames to the sheets, layering the sheets so that the supporting frames approximately overlay one another, and securing all open margins of the layered sheets except those margins corresponding to the container's open top.

In accordance with one aspect of the methods for manufacturing the invention, a drawstring is encased in a hem running along the top edge of the container, and at least one opening is created to expose the drawstring.

The container and method of manufacturing the container thus provide an inexpensive, compact, convenient way to store, transport, or dispose articles.

DETAILED DESCRIPTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 4:
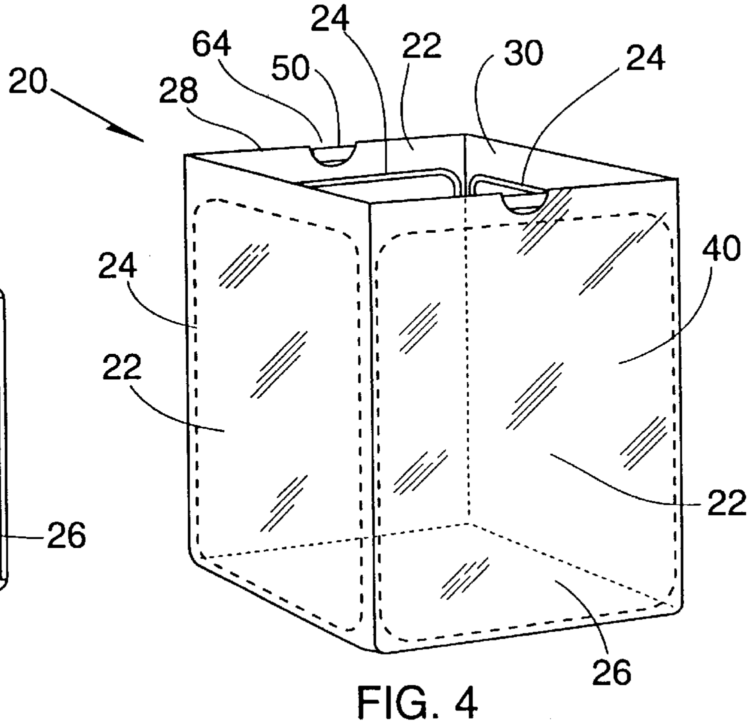
FIG. 4 is a perspective view of the semi rigid container.

The preferred embodiment of the present invention, a semi rigid container 20, is illustrated in FIGS. 1 through 4. As shown in FIG. 4, the container 20 has an open top 30 and includes four generally rectangular side walls 22 and a bottom wall 26. Each side wall 22 is arranged adjacent to another side wall 22 and the bottom wall 26 is connected to one side of each side wall 22. Although the container 20 is preferably formed from a single sheet of flexible material 40, folded and seamed using heat sealing or an adhesive, the container 20 can also be formed from multiple attached sheets. The flexible material 40 is preferably plastic, but could be manufactured of lightweight paper, canvas, cloth, or other flexible material.

Figure 1:
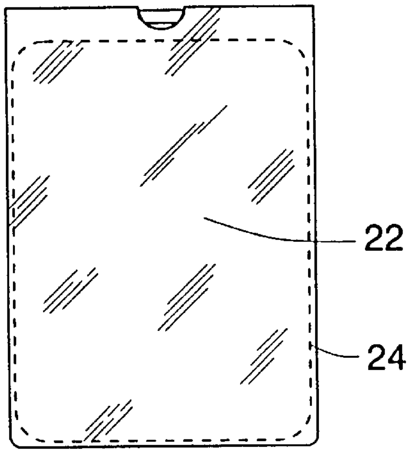
FIG. 1 is a front plan view of the semi rigid container.
Figure 2:
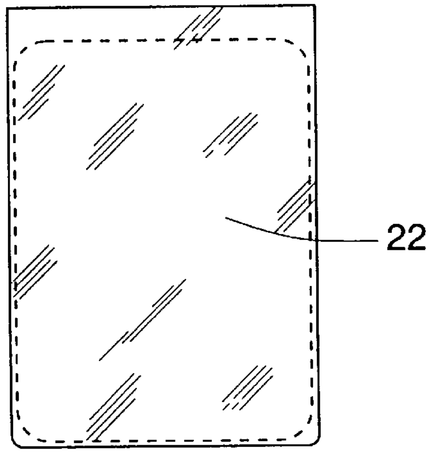
FIG. 2 is a side plan view of the semi rigid container.
Figure 3:
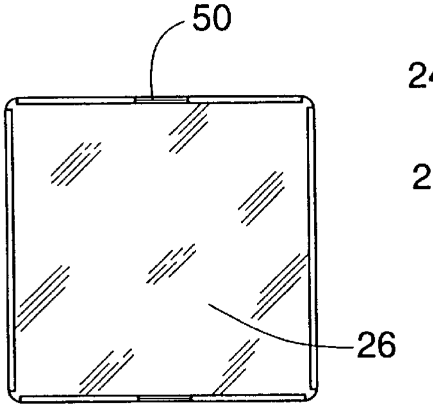
FIG. 3 is a top plan view of the semi rigid container.

As shown in FIGS. 1, 2 and 4, each side wall 22 includes a flexible supporting frame 24. The frame 24 is preferably formed from a sufficiently stiff yet resilient material such as plastic strapping or spring steel wire. The frame 24 is secured to the sheet 40 by heat sealing 45, FIG. 15A, an adhesive 46, FIG. 15B, or entrapping portions of the frame 24 between the first sheet 40 and a second sheet 42 or 44 of flexible material that are sealed together using heat sealing or an adhesive as depicted in FIGS. 15C, 15D, and 15E. The second sheet 44 used to entrap the frames can be generally the same size as the first sheet, FIG. 15D, or the second sheet 42 can generally conform to the shape of the supporting frames, FIGS. 15C and 15E. The combination of the side walls 22, frames 24 and bottom wall 26 form a container 20 that is capable of standing on its own.

Figure 13A:
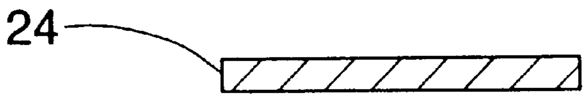
FIGS. 13A–13E show different cross-sections of the supporting frames 24.
Figure 13B:
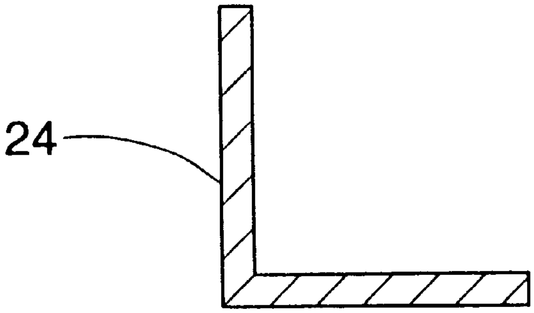
Figure 13C:
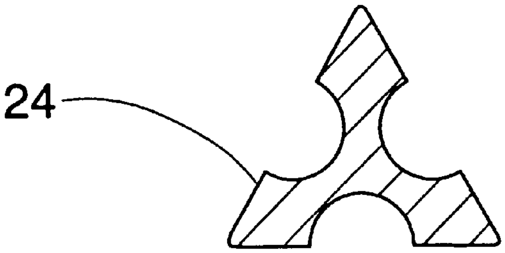
Figure 13D:
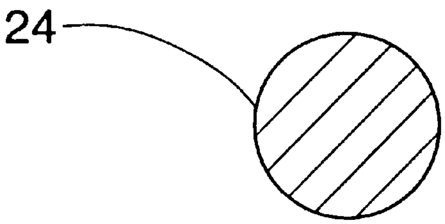
Figure 13E:
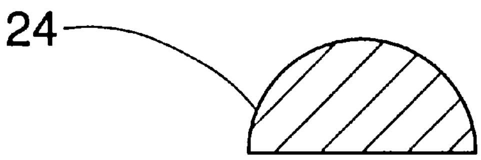

Although the preferred embodiment of the container 20 has a supporting frame 24 with a rectangular cross section as shown in FIG. 1 3A, a material with a different cross section can be used. For example, FIG. 13B depicts a frame 24 having an angle or L-shaped cross section, FIG. 13C depicts a frame 24 having a triangular with three semicircular grooves cross section, FIG. 13D depicts a frame 24 having a circular cross section, and FIG. 13E depicts a frame 24 having a semi-circular cross section.

Figure 14A:
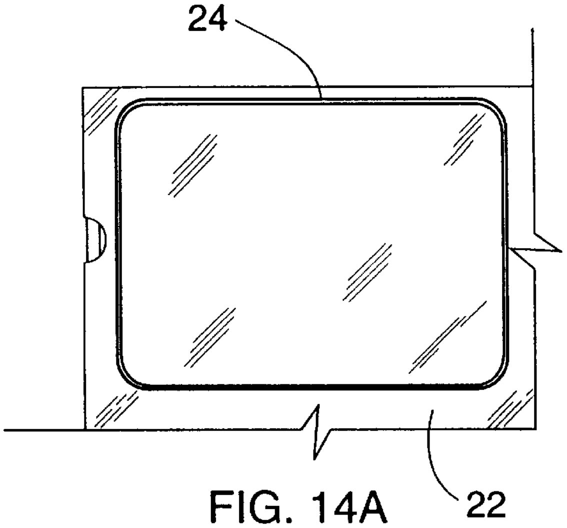
FIGS. 14A–14D depict different shapes of the supporting frames 24.
Figure 14B:
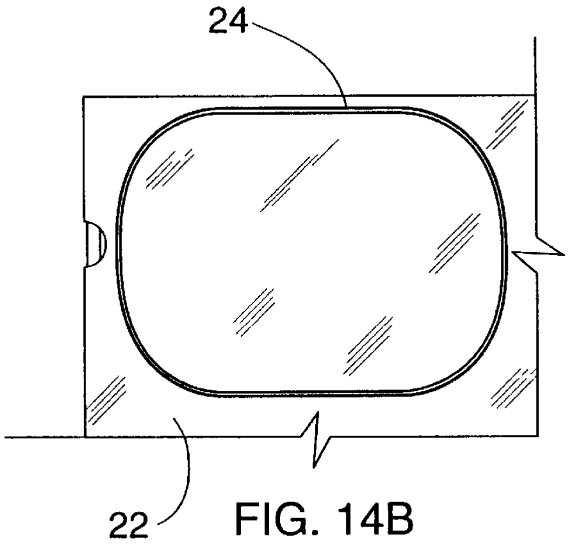
Figure 14C:
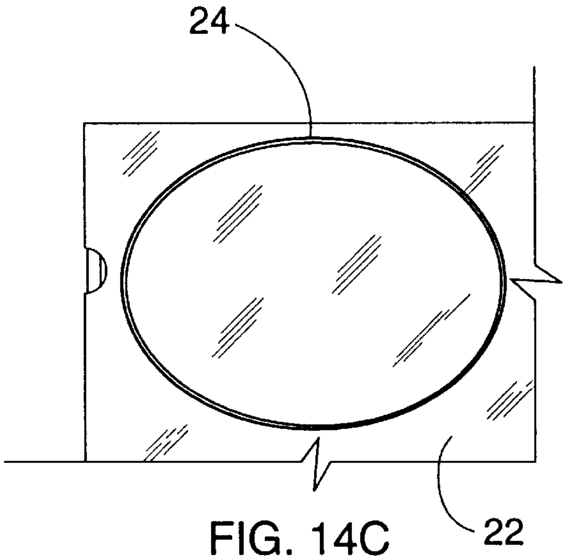
Figure 14D:
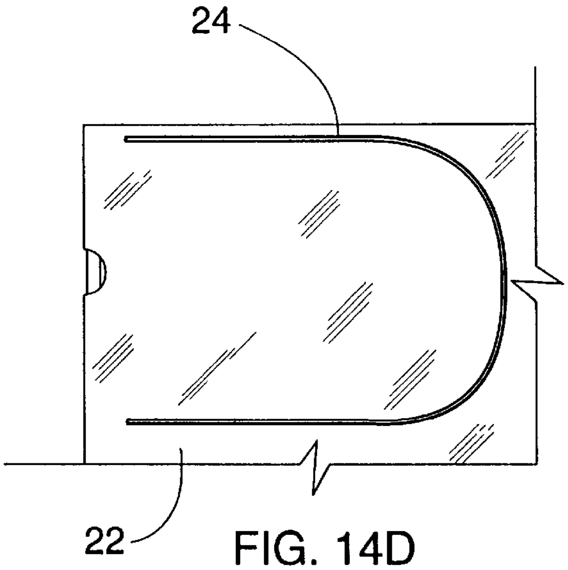

Although FIG. 14A shows the preferred shape of the supporting frames 24 being rectangular with rounded corners, the frames 24 can be generally rectangular with rounded ends as shown in FIG. 14B, generally oval as shown in FIG. 14C, U-shaped as shown in FIG. 14D, or any other shape providing sufficient rigidity to support the side walls 22.

A drawstring 50, shown in FIG. 4, is the preferred method of closing the container 20. The drawstring 50 is encased in a hem 66, as shown in FIG. 5B, running along the top edge 28 of the container 20. The drawstring 50 can be manufactured from plastic, a type of woven material such as string, or any other material sufficiently strong to close the opening 30. The closed drawstring 50 can also act as a type of handle [not shown] for the container 20.

Figure 5A:
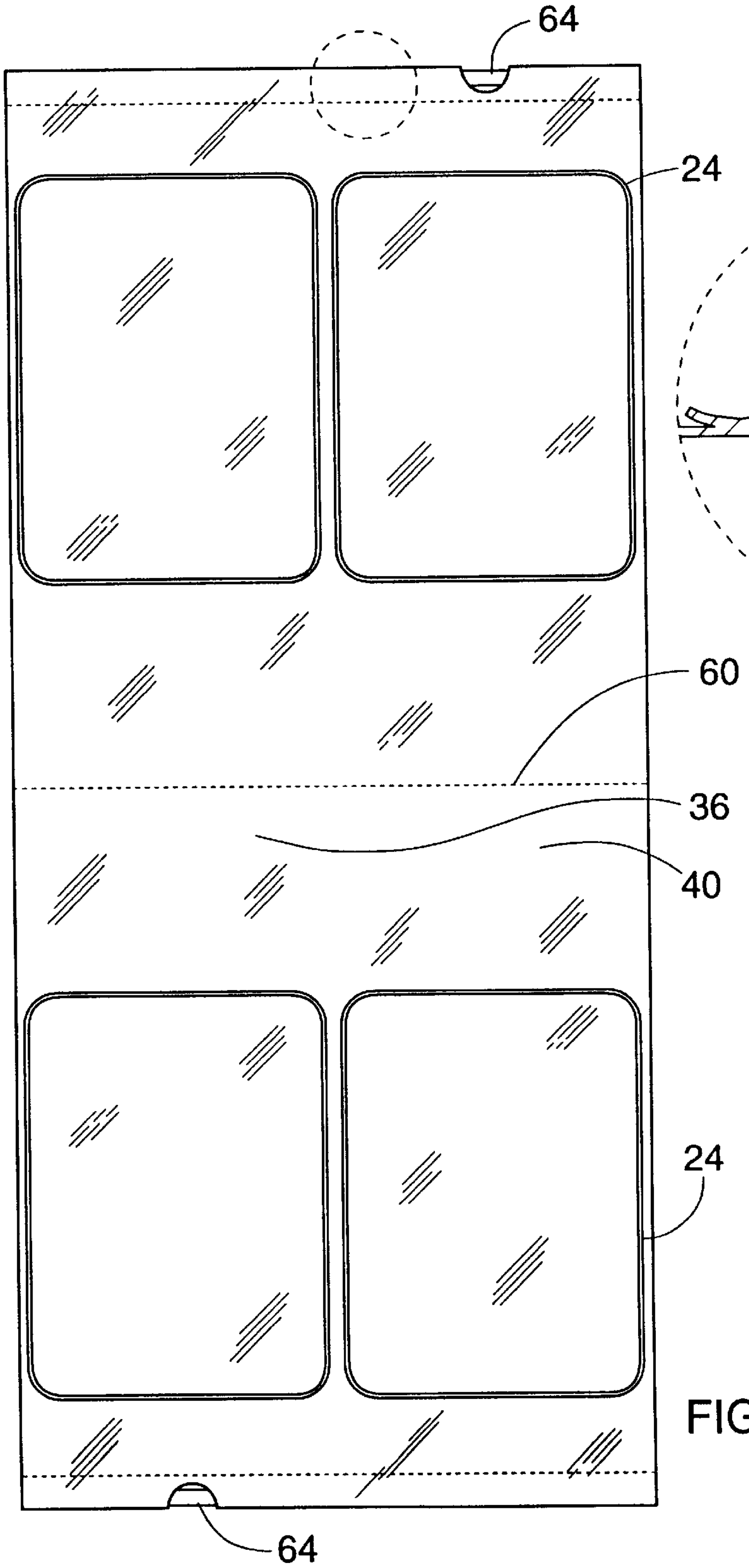
FIGS. 5A–7 depict a method of manufacturing the semi rigid container.
Figure 5B:
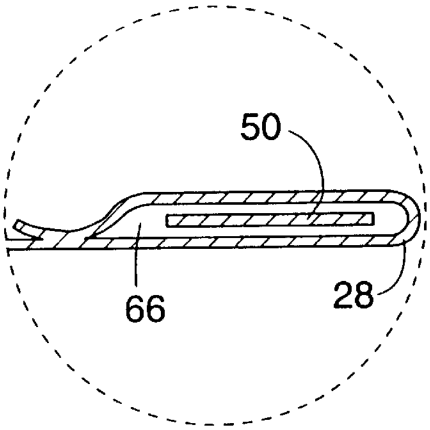
Figure 6:
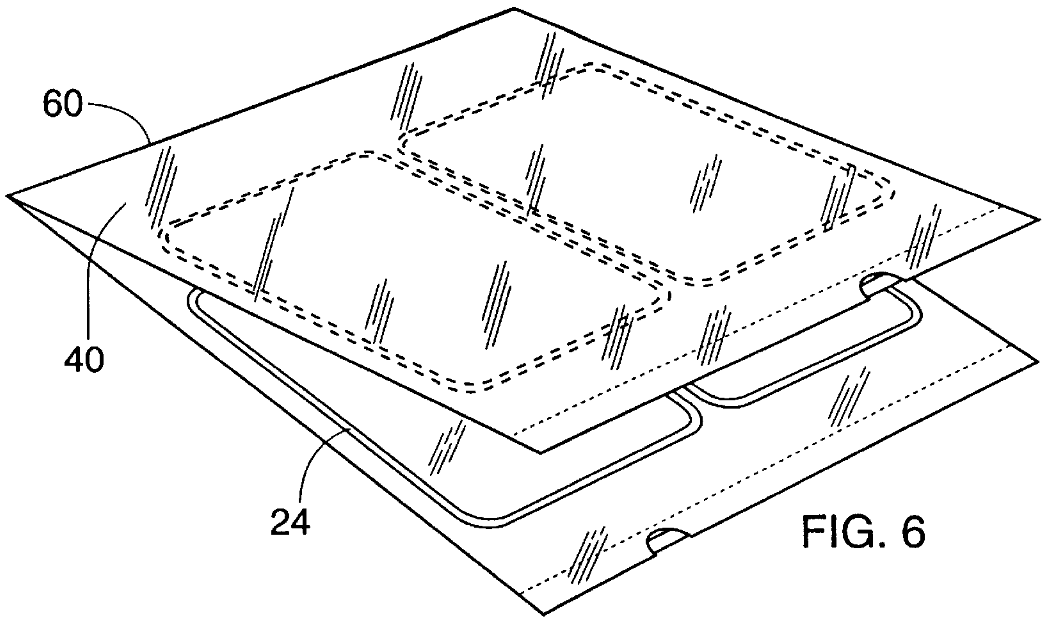
Figure 7:
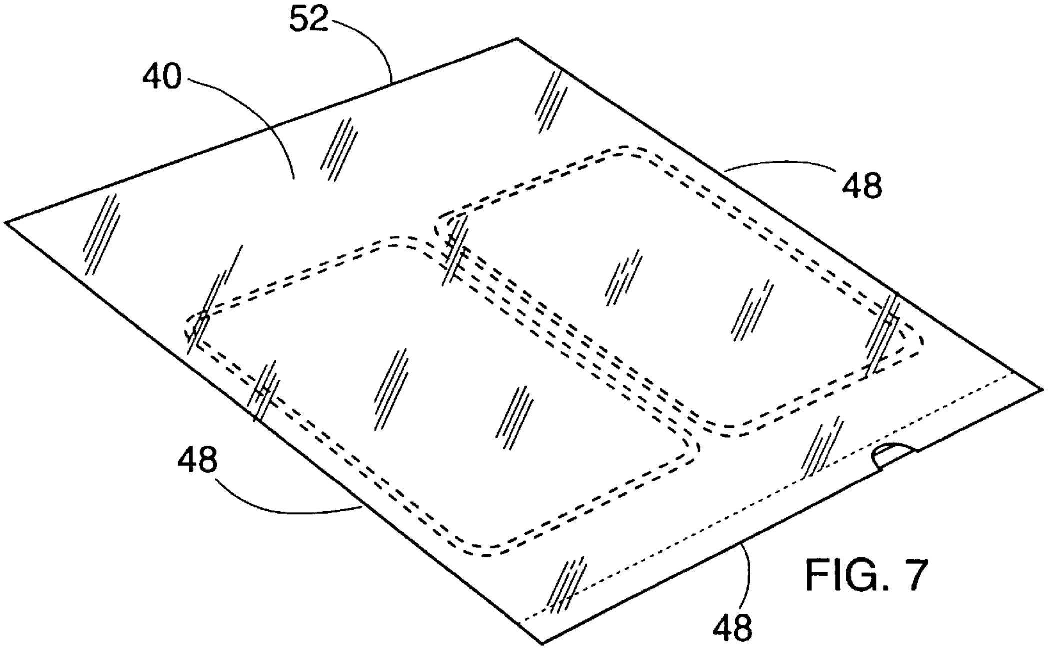

FIGS. 5–7 show various steps in the manufacturing process of the preferred embodiment of the container 20. FIG. 5A shows the supporting frames 24 positioned on a sheet of flexible material 40. The frames 24 are positioned such that ample material 36 is left to form the bottom wall 26 of the container 20. FIG. 5B shows the top edge 28 of the container 20 folded around the drawstring 50, essentially encasing the drawstring in a hem 66. Openings 64 are cut in the hem 66 so the drawstring is accessible.

Figure 16:
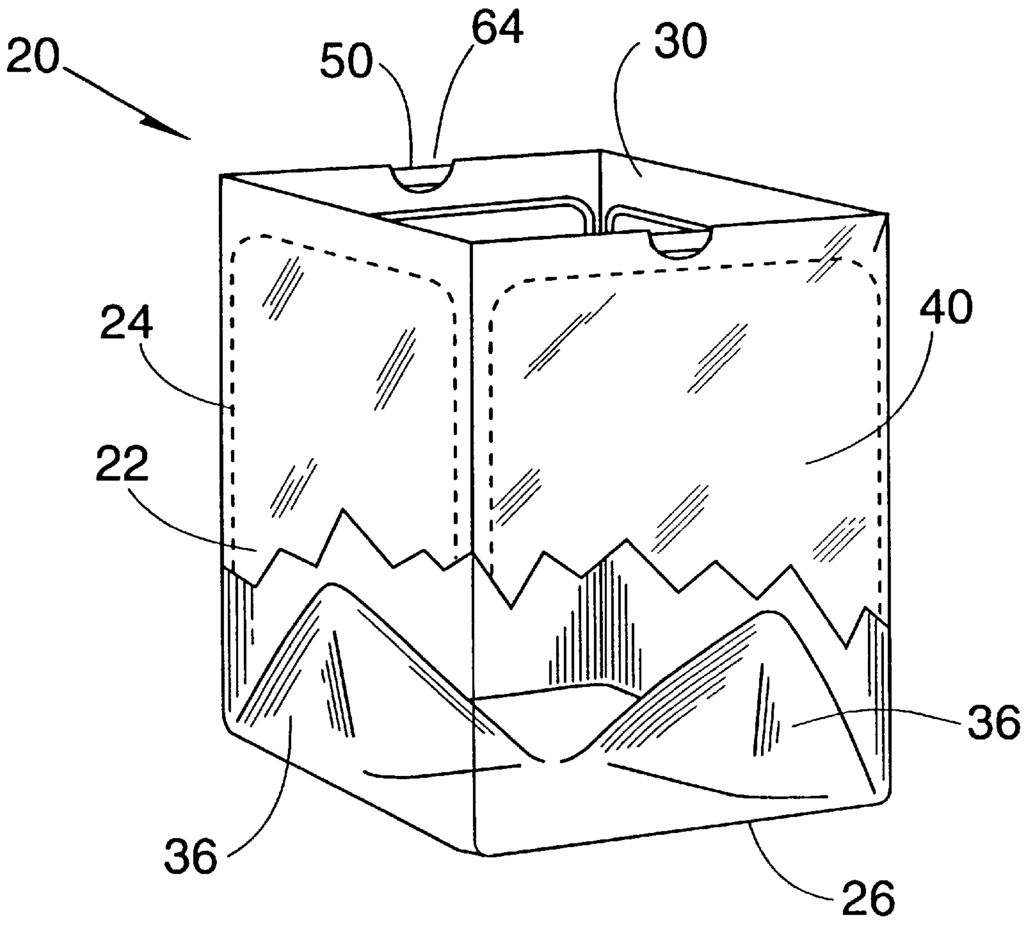
FIG. 16 is a perspective view of the semi rigid container with a cut away view showing the container's interior.

In the preferred method of manufacture once the supporting frames 24 are secured to the sheet 40, the sheet 40 is intermediately folded along line 60 so that each supporting frame 24 approximately overlays another supporting frame 24, as shown in FIG. 6. Once folded, the structure has three open margins 48 and one folded margin 52. The open margins adjacent to the folded margin 52 are sealed together using heat sealing or an adhesive. The third open margin, the margin corresponding to the top 30 of the container 20, is not sealed. The sealed sheet 40 can then be expanded into the semi rigid container 20. The aforementioned material 36 left to form the bottom wall 26 folds to form the bottom wall 26 as depicted in FIG. 16.

Figure 8:
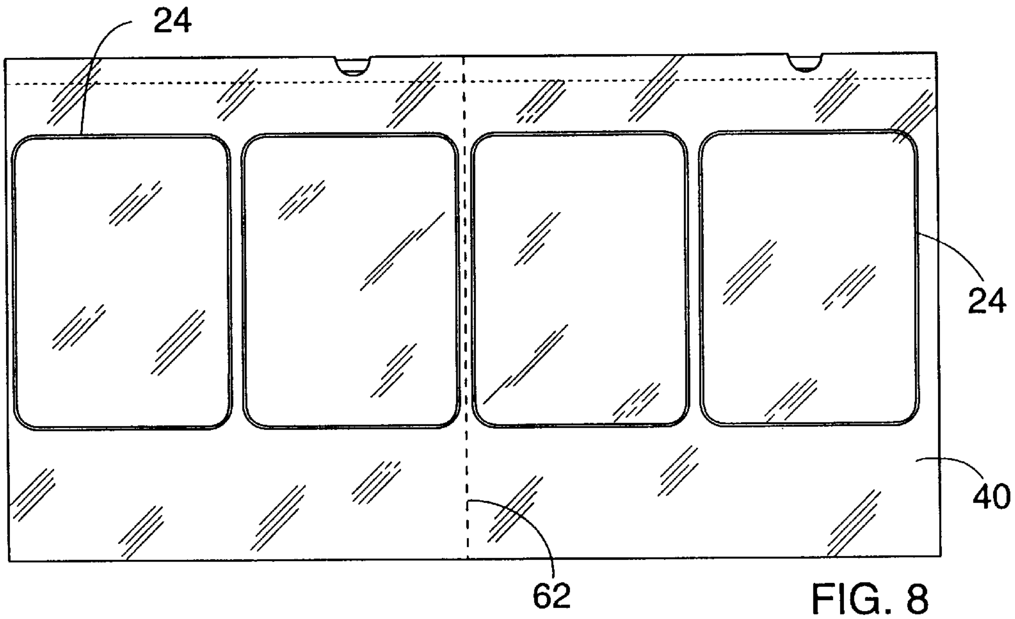
FIGS. 8–10 depict an alternate method of manufacturing the semi rigid container.
Figure 9:
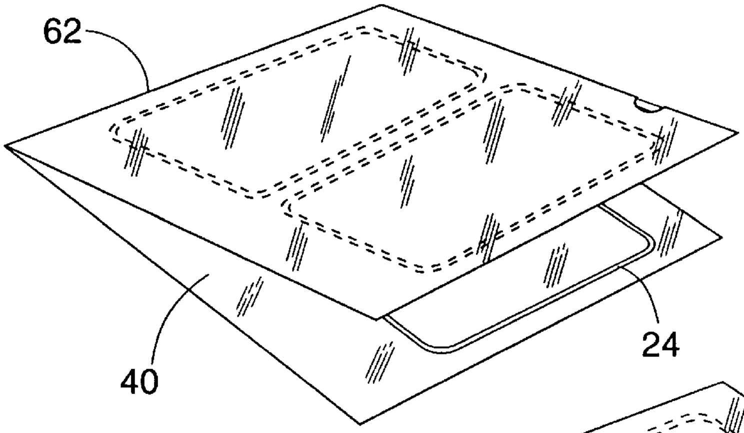
Figure 10:
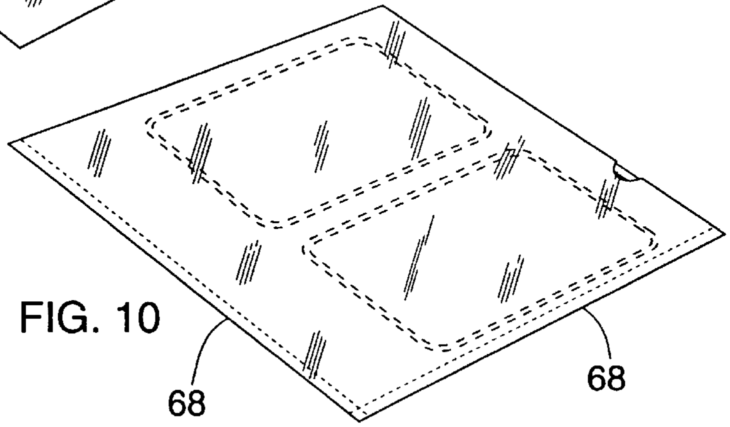

FIGS. 8–10 show an alternate method of manufacture where the supporting frames 24 are laterally positioned on the sheet 40 and secured. The sheet 40 is then intermediately folded along line 62 so that each supporting frame 24 approximately overlays another supporting frame 24, as shown in FIG. 9. Once folded, three open margins 68 are formed. Two of the open margins 68 of the folded sheet 40 are sealed. The two open margins 68 are sealed together using heat sealing or an adhesive. The third open margin, the margin corresponding to the top 30 of the container 20, is not sealed. The sealed sheet can then be expanded into the semi rigid container 20. The aforementioned material 36 left to form the bottom wall 26 folds to form the bottom wall 26 as depicted in FIG. 16.

Figure 11:
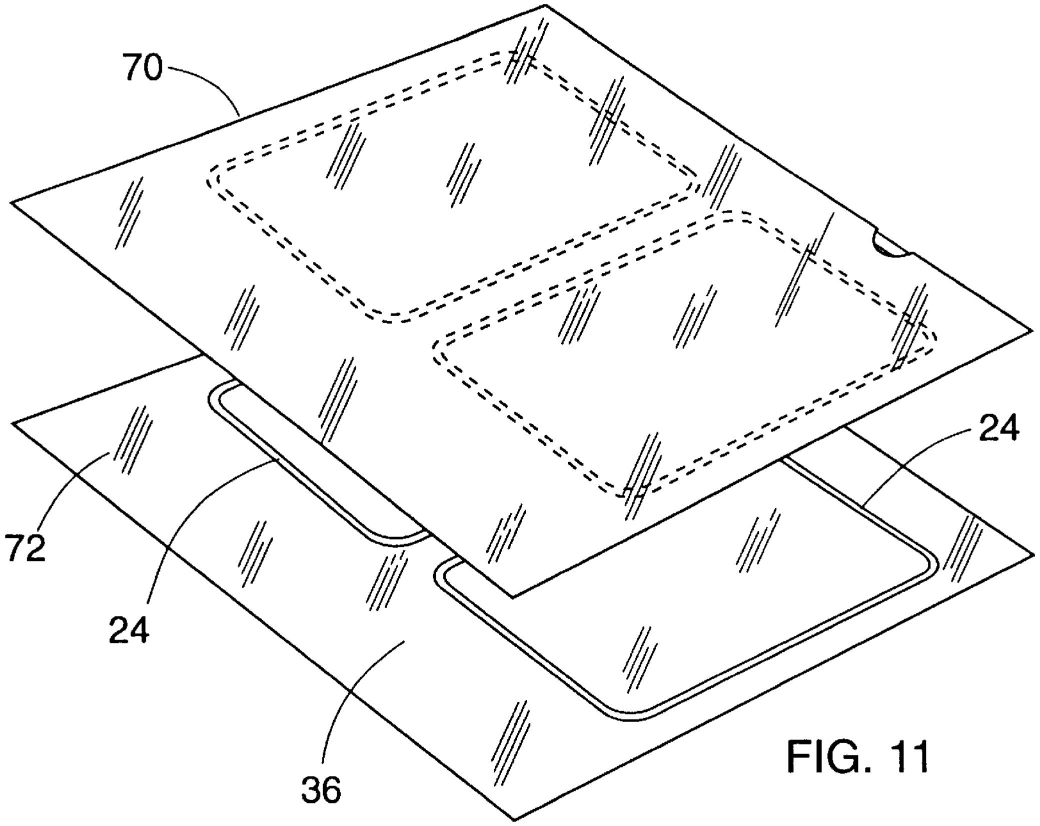
FIGS. 11–12 depict another alternate method of manufacturing the semi rigid container.
Figure 12:
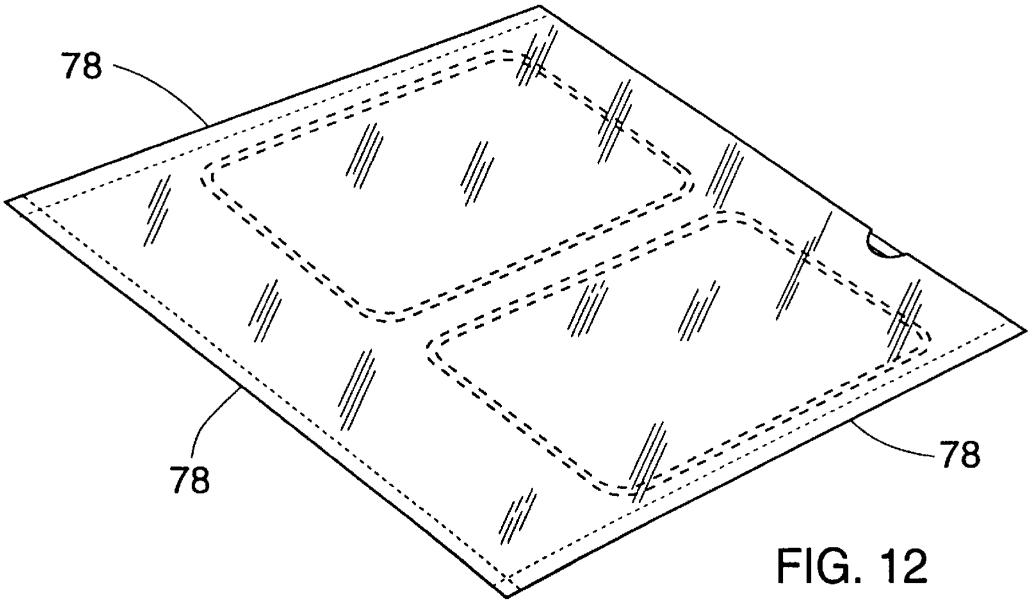

FIGS. 11 and 12 show another method of manufacture where the supporting frames 24 are positioned and secured to two sheets of flexible material 70 and 72. Again, the frames 24 are positioned such that ample material 36 is left to form the bottom wall 26 of the container 20. The two sheets 70 and 72 are then overlayed, as shown in FIG.11, making sure that each supporting frame 24 approximately overlays a corresponding supporting frame 24. Three open margins 78 are sealed together using heat sealing or an adhesive. The fourth open margin, the margin corresponding to the top 30 of the container, is not sealed. The sealed sheets can then be expanded into the semi rigid container 20, shown in FIG. 16, the aforementioned material 36 left to form the bottom wall folds to form the bottom wall 26.

Figure 15A:
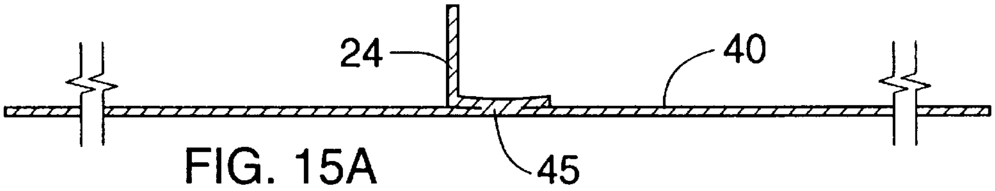
FIG. 15A–15E depict different means of attaching the supporting frames to the flexible sheet material.
Figure 15B:
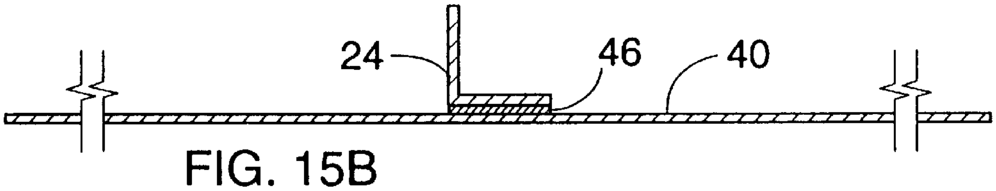
Figure 15C:
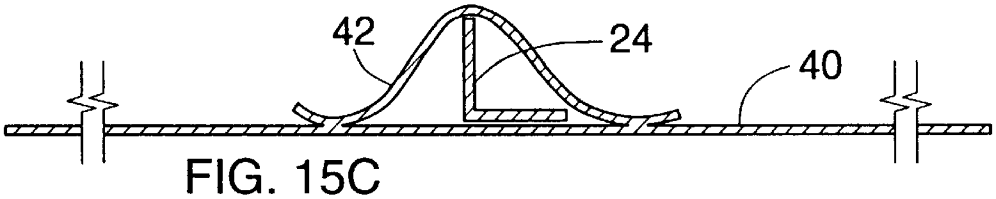
Figure 15D:
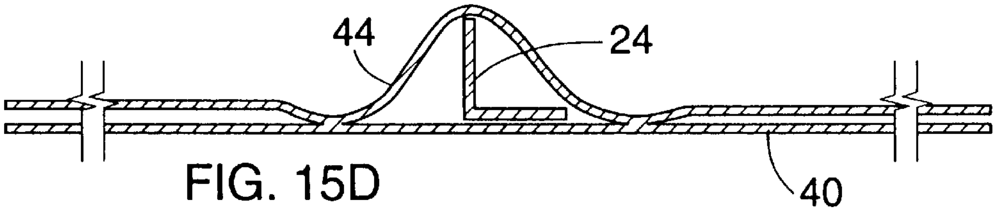
Figure 15E:
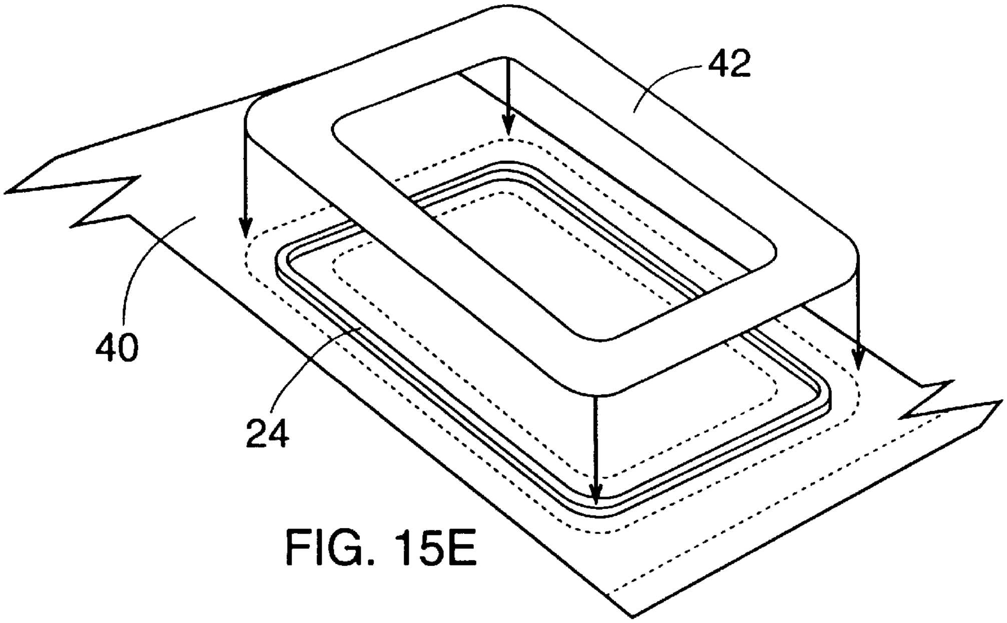

Even though the preferred method of securing the supporting frames 24 to the sheet 40 or 70/72 is heat sealing, FIG. 15A, an adhesive 46, FIG. 15B, can be used. FIGS. 15C–15E depict another method of securing the supporting frames 24 to the sheet 40 by providing a second sheet of flexible material 42 or 44 and entrapping portions of the frame 24 between the two sheets of material, FIG. 15E, that are sealed together at marginal portions of the supporting frames 24 using heat sealing or an adhesive. The second sheet 44 may generally correspond to the size of the original sheet, FIG. 15D, or the second sheet 42 may roughly conform to the shape of the supporting frames, FIGS. 15C and 15E.

FIG. 5B shows the method of providing a drawstring 50. The drawstring 50 is encased in a hem 66 running along the edge corresponding to the open top 30 of the container 20. One or more openings 64 are provided in the hem 66 to expose the drawstring 50 so that the drawstring 50 can be easily used.

Although heat sealing and the use of an adhesive are presented as the preferred means for attaching the elements of the container 20, it is to be understood that other methods of connecting the elements can be used. Accordingly, construction of the container should not be limited to heat sealing and/or the use of an adhesive alone.

Figure 17A:
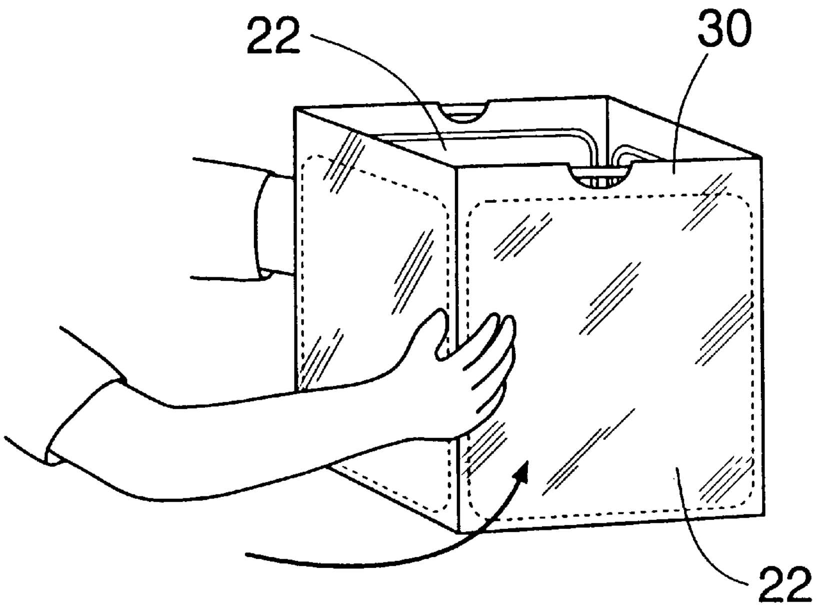
FIGS. 17A and 17B depict the method of collapsing the semi rigid container.
Figure 17B:
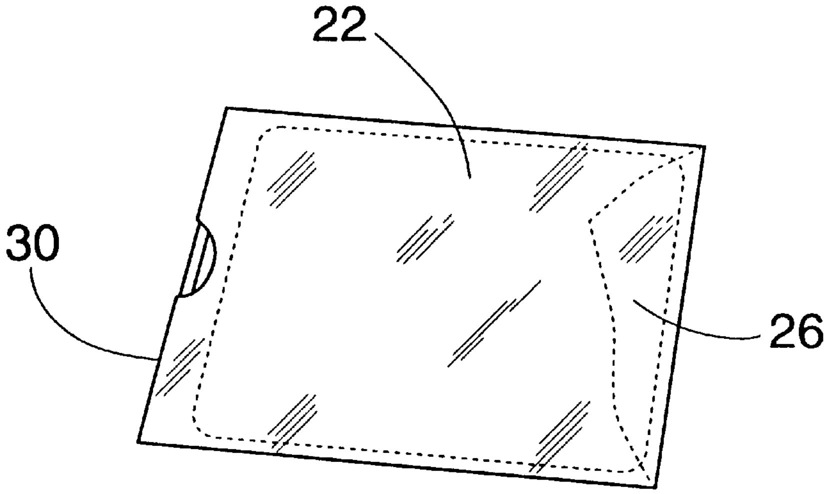

From the expanded state, the container 20 may be folded into a collapsed state for easy storage prior to use. FIGS. 17A and 17B show various steps for collapsing the container 20. Referring to FIG. 17A, the first step requires grasping opposite sides 22 of the container 20 and biasing one corner toward the other until all side walls 22 are adjacent and overlay each other. The next step, shown in FIG. 17B, includes inserting the bottom wall 26 between two of the adjacent overlaying side walls 22. The resulting collapsed container 20 is a stack of four side walls.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A method of making a semi rigid container having an open top, said method comprising the steps of:

providing a sheet of flexible material having at least one layer;

positioning a plurality of supporting frames upon said sheet;

securing said supporting frames to said sheet;

folding said sheet intermediately so that each said supporting frame approximately overlays another said supporting frame;

sealing all open margins of said layered sheet except those open margins corresponding to said container's open top.

2. The method of claim 1 further including the steps of:

providing at least one drawstring;

encasing said drawstring in a hem running along at least one edge of said sheet corresponding to said container's open top;

creating at least one opening in said hem exposing said drawstring.

3. The method of claim 1 wherein said supporting frames are secured to said sheet by means of heat sealing.

4. The method of claim 1 wherein said supporting frames are secured to said sheet by means of an adhesive.

5. The method of claim 1 wherein said supporting frames are secured to said sheet by means of providing at least one second sheet of flexible material having at least one layer;

overlaying said sheet with said second sheet enveloping at least portions of said supporting frames between said sheet and said second sheet;

securing said sheet to said second sheet at least at marginal portions at either side of said supporting frames.

6. The method of claim 5, wherein said sheet and said second sheet are sealed by means of heat sealing.

7. The method of claim 5, wherein said sheet and said second sheet are sealed by means of an adhesive.

8. A method of making a semi rigid container comprising the steps of:

providing at least two sheets of flexible material having at least one layer each;

positioning a plurality of supporting frames upon said sheets;

securing said supporting frames to said sheets;

layering two of said sheets so that each said supporting frame approximately overlays another said supporting frame;

sealing all open margins of said layered sheets except those open margins corresponding to said container's open top.

9. The method of claim 8 further including the steps of:

providing at least one drawstring;

encasing said drawstring in a hem running along at least one edge of said sheet corresponding to said container's open top;

creating at least one opening in said hem exposing said drawstring.

10. The method of claim 8 wherein said supporting frames are secured to said sheet by means of heat sealing.

11. The method of claim 8 wherein said supporting frames are secured to said sheet by means of an adhesive.

12. The method of claim 8 wherein said supporting frames are secured to said sheet by means of providing at least one second sheet of flexible material having at least one layer;

overlaying said sheet with said second sheet enveloping at least portions of said supporting frames between said sheet and said second sheet;

securing said sheet to said second sheet at least at marginal portions at either side of said supporting frames.

13. The method of claim 12 wherein said sheet and said second sheet are sealed by means of heat sealing.

14. The method of claim 12 wherein said sheet and said second sheet are sealed by means of an adhesive.

* * * * *

UNITED STATES PATENT AND TRADEMARK OFFICE

CERTIFICATE OF CORRECTION

PATENT NO. : 6,059,912
DATED : May 9, 2000
INVENTOR(S) : Kellogg et al.

It is certified that error appears in the above-identified patent and that said Letters Patent is hereby corrected as shown below:

Title page,
Item [56], U.S. PATENT DOCUMENTS,
Please insert -- D406,423 3/1999 Kellogg et al --; and
-- D315,432 3/1991 Smith --

Signed and Sealed this

Twenty-sixth Day of November, 2002

*Attest:*

JAMES E. ROGAN

*Attesting Officer*

*Director of the United States Patent and Trademark Office*